United States Patent [19]

Specht

[11] Patent Number: 4,503,096
[45] Date of Patent: Mar. 5, 1985

[54] METHOD AND DEVICE FOR THE CONTINUOUS APPLICATION OF A REINFORCEMENT LAYER ONTO A POROUS MINERAL BUILDING BOARD

[75] Inventor: Manfred Specht, Groebenzell, Fed. Rep. of Germany

[73] Assignee: Ytong AG, Munich, Fed. Rep. of Germany

[21] Appl. No.: 530,464

[22] Filed: Sep. 8, 1983

[51] Int. Cl.³ .................. B05D 1/28; B05D 3/12; B05C 1/06; B05C 11/02
[52] U.S. Cl. .................. 427/359; 118/110; 118/118; 118/119; 118/258; 118/262; 427/369; 427/428
[58] Field of Search .............. 118/110, 118, 119, 262, 118/258; 427/359, 369, 370, 428

[56] References Cited

U.S. PATENT DOCUMENTS 3,508,523  4/1970  De Meerleer .................. 427/428 X

FOREIGN PATENT DOCUMENTS 2314531  10/1974  Fed. Rep. of Germany ...... 118/262

Primary Examiner—Michael R. Lusignan
Attorney, Agent, or Firm—Larson and Taylor

[57] ABSTRACT

Method and device for the continuous application of a layering mass on boards, whereby a rotating application roller and a rotating smoothing roller located directly behind the application roller in the direction of transport of the boards are used which can be separately driven and adjusted in height, a transport means for the boards is located under the rollers, and a scraper is associated with the smoothing roller. The layering mass is applied to the boards with the application roller and smoothed with the smoothing roller, which rotates counter to the direction of transport of the boards. The layering mass is a mineral fresh mortar which is applied to the boards in the area of the lower gusset between the rollers. The application roller rotates counter to the direction of transport of the boards.

13 Claims, 1 Drawing Figure

U.S. Patent  Mar. 5, 1985  4,503,096
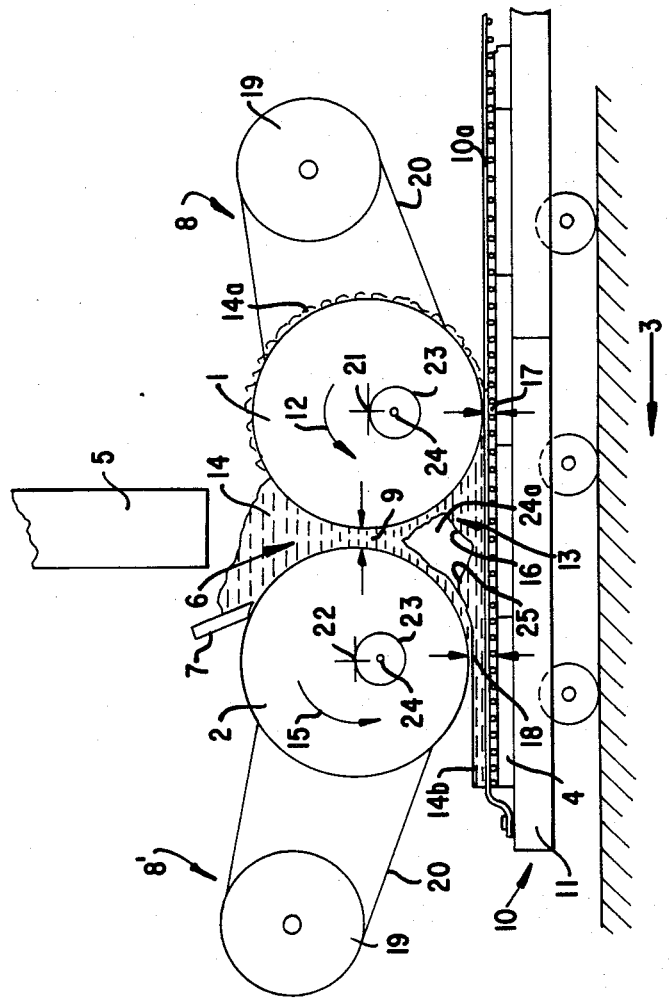

METHOD AND DEVICE FOR THE CONTINUOUS APPLICATION OF A REINFORCEMENT LAYER ONTO A POROUS MINERAL BUILDING BOARD

The invention concerns a method for the continuous application of a reinforcement layer onto a porous mineral building board, especially onto a gas concrete board or a similar mineral porous building board, whereby the layer is applied by a rotary application roller onto building board transported underneath the roller and a post-treatment of the layer is performed by a smoothing roller.

The invention also concerns a device for carrying out the method wherein the application roller and the smoothing roller can be separately driven and adjusted in height in an infinitely variable manner and a scraper is associated with the smoothing roller.

In the prior art, primer is applied by a known device in the direction of advance. A special dosing roller is provided to this end in front of the application roller. A gusset formed by the application roller and the dosing roller receives the primer. The application roller is driven in the direction of advance of the carrier work material while the smoothing roller is driven in the direction opposite to the direction of advance. The application roller and the smoothing roller therefore rotate in different directions.

However, a smooth and even surface and an intimate union with the carrier work material can only be achieved with certain primers and carrier work materials (plastic coating on particle board) and then only if very thin coats are to be applied. It was found that it is not possible to apply mineral mortar with the known method and the known device. Thus, this state of the art could not be used, for example, to coat a gas concrete board in order to manufacture a reinforced gas concrete building part according to DE-OS No. 28 54 228. The known gas concrete building part is reinforced on the surface with at least a glass fiber mat, preferably a glass fiber fabric, whereby the glass fiber mat is located on the surface of the gas concrete board, contacts the surface, is embedded in a solid layer of mortar and is connected to the gas concrete board over the hardened layer of mortar. This connection is assured by the fact that the mortar penetrates the holes in the mat, adheres to the surface of the gas concrete board and in particular remains in the surface pores of the gas concrete board, creating a "stud-like" anchoring of the mortar and of the reinforcement mat.

There was previously no mechanical, continuous method for applying a layer to produce such building boards. The devices which have been known for some time are, as has already been mentioned, not suitable, as a mineral mortar cannot be processed by them. In particular, however, the positioning of reinforcement elements during the application of the mortar poses problems that are difficult to resolve.

The invention has the task of indicating a method and a device with which mineral mortars, especially those with reinforcement elements, can be applied onto a porous mineral building board.

This task is solved in accordance with the invention described below with reference to the accompanying drawing which is a side elevational view of the device in operation.

Referring to the drawing, the device of the invention has a known application roller 1 and a known smoothing roller 2 parallel to it. Both rollers form a slot 9 between each other. They can be driven independently of each other by suitable means (not shown), preferably in an infinitely variable manner. A transport means 10, e.g. a transport belt or transport carriage 11 is located under rollers 1 and 2. This transport means is moved in the direction of arrow 3 during application and transports boards 4 to be coated during the application, preferably in a continuous manner. Boards 4 can be positioned on the transport means flush with each other in series and/or side by side and/or with intervening spaces. Reinforcement mat 10a lies loosely on the surface of building boards 4 which faces rollers 1 and 2. It can extend over gaps between the boards and is fastened in accordance with the method of the invention by its initial area, for example, as the drawing shows, to the front edge of the first building board 4 or to transport means 10 so that it can not be shifted during the coating process with the coating means. It is continuously pulled off a roll (not shown), for example, along with the advance of transport means 10 and placed on the surface of building boards 4.

It is essential that application roller 1 is driven in the direction of arrow 12, so that a movement results in the mortar application area of roller 1 which is opposite to the direction of movement of building boards 4 (direction of arrow 3). Reversing the known principle surprisingly makes it possible to apply a mineral fresh mortar with the following composition, for example, and with a thickness of 1 to 4, preferably 2 to 5 mm:

40 to 70% by wt. sand (granulation 0 to 0.5 mm)
25 to 60% by wt. binder, preferably cement
3 to 10% by wt. calcium hydroxide
0.3 to 0.6% by wt. methyl cellulose.

Instead of or as a supplement of methyl cellulose, a 50-50 latex dispersion, especially a styrol-butadiene-latex dispersion, is preferably used which is compounded at 1 to 5 to 1 to 10 with water. The mortar is preferably applied with a water solid factor of approximately 0.3. Advantageously, a known adhesive agent is applied to the board surface before the mortar is applied. This adhesive agent assures that the hardened mortar is firmly anchored to the surface of the gas concrete and in the pores. The adhesive agent can also be mixed in homogeneously with the fresh mortar. The above-named synthetic latex is preferably used as the adhesive agent.

The fresh mortar in lower gusset 13 between rollers 1 and 2 is fed to boards 4 in combination with the opposing direction of rotation of application roller 1. To this end fresh mortar 14 is fed by mortar feed device 5 into upper gusset 6. As a consequence of the direction of rotation in the direction of arrow 12, roller 1 causes the fresh mortar to flow out of upper gusset 6 through slot 9 into lower gusset 13 and onto the board surface. The amount of flow-through depends on the width of slot 9, the speed of rotation of roller 1 and the speed of rotation of roller 2, which rotates, as is known, in the direction of arrow 15, i.e. counter to roller 1. As these parameters can be varied according to the invention, the amount of flow-through can be precisely dosed.

The mortar present in gusset 13 should form a bead-like reservoir 16 in front of roller 1, so that there is always enough application material in bead-like accumulation of material 16. To this end an interval is set between roller 1 and the surface of boards 4 which ammounts to only a few millimeters, preferably approximately 1 mm. This assures that only a small amount of mortar 14a passes between roller 1 and the board surface and is transported with roller 1 to the rear out of gusset 13. The amount of mortar exiting to the rear clings to the surface of roller 1 and is carried along by it as rotating material and fed back to the mortar bed in gusset 6. This also assures that the application is performed without gaps, as if with a blade, and that roller 1 presses or massages the mortar, especially as a consequence of bead 16 and the direction of rotation, with a slight superpressure through the meshes of the reinforcement mat into the pores. The pressure becomes particularly effective if gusset 13 is almost completely filled with mortar. In this way the application pressure can also be affected by the degree of filling in gusset 13.

Smoothing roller 2 runs, as is known, in the direction of rotation of arrow 15, that is, counter to the direction of advance of the boards. Slot 18 between roller 2 and the surface of boards 4 is adjustable and assures the desired layer thickness of the mortar from e.g. 2 to 2.5 mm. The direction of rotation of roller 2, which is opposite to the direction of transport of the boards, which are 2 to 40 cm thick, produces the desired smoothing effect on mortar surface 14b in a known manner and also massages the mortar into the fabric of the reinforcement mat and into the pores of building boards 4. The mortar which remains clinging to smoothing roller 2 and is transported up by it in gusset 13 from known mortar bead 25 following roller 2 is caught for the most part by the counterflow of the mortar flowing down from gusset 6 through slot 9 and is transported down again. An air hole 24a can develop during this circulation of the mortar which functions during the application of the mortar like a catch container for excess mortar material. If the air hole becomes too large, material is lacking; if it becomes too small, the feed must be choked.

The mortar which is transported upward by smoothing roller 2 from the mortar bed in gusset 13 is scraped off in a known manner by scraper 7, which works against the surface of roller 2, as shown, so that a clean, smooth surface of roller 2 is available for smoothing the mortar on boards 4.

The variability of slots 9, 17 and 18 is assured in accordance with the invention by known eccentric adjusting devices 8 and 8'. Each of the eccentric adjusting devices advantageously consists of an adjusting wheel 19 connected over a drive belt 20 to a rotary disk (not shown, as it is known) on rollers 1 and 2. Axles 21 and 22 of rollers 1 and 2 are mounted in an eccentric guide (not shown, as it is known), so that when adjusting wheels 19 are rotated, axles 21 and 22 can be shifted on their small circle 23 about axis 24. These possibilities of shifting in combination with the infinitely variable running speeds of rollers 1 and 2 and of transport means 10 create the possibility of applying fresh mortar even in thin layers without gaps and with reinforcement elements in a continuous and mechanical manner.

Individual boards can be reinforced and coated with the new method and device. It is also possible to manufacture a composite board consisting of several boards lying flush with each other in series and next to each other by means of reinforcement and coating. Especially as regards the manufacture of a composite board, the state of the art has nothing comparable to offer. The known devices are not suitable because the direction of rotation of the application roller can result in a slipping of the board specimen and of the reinforcement material. However, changing the direction of rotation was not readily obvious, because it has an adverse effect on the mortar feed. The inventive idea of filling the mortar into gusset 6, allowing it to flow through slot 9 and applying it in gusset 13 was also not obvious, because there was the risk that too much mortar might be ejected from the device to the rear. This risk is prevented by the invention by setting slot 17 as narrow as possible, while in the state of the art it is set as wide as possible. The application in gusset 13 was also not obvious, because too much mortar material is removed again by the counterrotation of smoothing roller 2 in the area of slot 9, so that too little material remains in gusset 13 for the application of mortar. The invention can surprisingly solve this problem by running application roller 1 faster than smoothing roller 2. In combination therewith, changing the width of slot 9 and/or changing the transport speed of boards 4 can produce optimum conditions for the application of the mortar. Thus, the invention makes it possible, by making ingeniously simple changes in known methods and devices, to manufacture, for example, reinforced gas concrete boards such as those described in DE-OS No. 28 54 228 in a mechanical and continuous manner.

It is claimed:

1. A method for the continuous application of a layering mass comprising a mineral fresh mortar on boards with a device which comprises a rotating application roller and a rotating smoothing roller positioned directly behind the application roller in the direction of transport of the said rotating application roller and said rotating smoothing roller being located above said boards, comprising spacing said application roller and said smoothing roller so as to form a lower gusset between the rollers, feeding said layering mass into the area of the lower gusset while rotating the application roller counter to the direction of transport of the boards to apply said layering mass to said boards and rotating the smoothing layer counter to the direction of transport of the boards to smooth the applied layering mass.

2. A method according to claim 1, wherein prior to the application of the layering mass a reinforcement mat is immovably positioned on the boards.

3. A method according to claim 2, wherein the reinforcement mat is fastened to the front end of the board transport means and is taken off a roll by means of the movement of the transport means, whereby it is placed on the board surface to be coated.

4. A method according to claim 1 the mineral fresh mortar comprises
   40 to 70% by wt. sand (granulation 0 to 0.5 mm)
   25 to 60% by wt. binder
   3 to 10% by wt. calcium hydroxide
   0.3 to 0.6% by wt. methyl cellulose.

5. A method according to claim 1 wherein the fresh mortar is applied in a layer thickness of 1 to 4 with a water solid factor of approximately 0.3.

6. A method according to claim 1 wherein the fresh mortar is applied to gas concrete boards 2 to 40 cm thick.

7. A method according to claim 1 wherein during the application of the fresh mortar the application roller rotates more rapidly than the smoothing roller.

8. A method according to claim 1 wherein the fresh mortar is added to an upper gusset between the rollers and is conveyed by the application roller through a slot between the rollers into the lower gusset.

9. A device for coating boards with a layering mass comprising a rotating smoothing roller, a rotating application roller located directly in front of said smoothing roller in the direction of transport of the boards, said smoothing roller and said application roller being spaced so as to form a slot therebetween transport means for the boards located under the rollers, a scraper associated with the smoothing roller means for rotating the smoothing roller counter to the direction of transport of the board, means for rotating the application rollers counter to the direction of transport of the boards and means for feeding the layering mass in the slot between said rollers.

10. A device according to claim 1, wherein the feeding means for the layering mass is located over and between the rollers.

11. A device according to claim 9 including means for laterally adjusting at least one of the rollers so that the width of the slot can be changed.

12. A device according to claim 9 including an eccentric adjusting means for adjusting the rollers in height and laterally.

13. A device according to claim 12, wherein the eccentric adjusting means that comprises an adjusting wheel connected over a drive belt to a rotary disk on the said roller, the axle of the roller being mounted in an eccentric guide so that when the adjusting wheel is rotated, the axle can be shifted on its small circle about the associated axis.

* * * * *